US007911106B2

(12) United States Patent
Takahashi et al.

(10) Patent No.: US 7,911,106 B2
(45) Date of Patent: Mar. 22, 2011

(54) ROTARY ELECTRIC MACHINE

(75) Inventors: Kazuhiko Takahashi, Hitachi (JP);
Masami Sukeda, Takahagi (JP);
Mitsuru Saeki, Hitachinaka (JP);
Kenichi Hattori, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 333 days.

(21) Appl. No.: 12/037,957

(22) Filed: Feb. 27, 2008

(65) Prior Publication Data

US 2008/0238240 A1    Oct. 2, 2008

(30) Foreign Application Priority Data

Mar. 29, 2007   (JP) .................................. 2007-087357
Jan. 24, 2008   (JP) .................................. 2008-013229

(51) Int. Cl.
*H02K 3/00*     (2006.01)
*H02K 17/00*    (2006.01)
*H02K 19/00*    (2006.01)
*H02K 21/00*    (2006.01)
*H02K 23/26*    (2006.01)
*H02K 27/02*    (2006.01)

(52) U.S. Cl. ........ 310/201; 310/179; 310/180; 310/184; 310/198; 310/206

(58) Field of Classification Search .................. 310/179, 310/180, 184, 198, 201, 206; *H02K 1/00, H02K 3/00, 3/04, 17/00, 19/00, 21/00, 23/26, H02K 27/02*
See application file for complete search history.

(56) References Cited

U.S. PATENT DOCUMENTS

| 5,654,602 | A  | * | 8/1997  | Willyoung ..................... 310/179 |
| 6,181,044 | B1 | * | 1/2001  | Umeda et al. .................. 310/201 |
| 6,326,715 | B1 | * | 12/2001 | Asao et al. ..................... 310/180 |
| 6,762,528 | B2 | * | 7/2004  | Wada et al. .................... 310/201 |
| 6,825,589 | B2 | * | 11/2004 | Kouda et al. ................... 310/207 |
| 7,750,525 | B2 | * | 7/2010  | Takahashi et al. ............ 310/179 |
| 7,786,642 | B2 | * | 8/2010  | Takahashi et al. ............ 310/184 |
| 2001/0040416 | A1 | * | 11/2001 | Nakamura et al. ............ 310/201 |

(Continued)

FOREIGN PATENT DOCUMENTS

JP    2000-50549    2/2000

(Continued)

OTHER PUBLICATIONS

Operation and Maintenance of Large Turbo-Generators, IEE Press, (2004) p. 62.

*Primary Examiner* — Quyen Leung
*Assistant Examiner* — John K Kim
(74) *Attorney, Agent, or Firm* — Antonelli, Terry, Stout & Kraus, LLP.

(57) ABSTRACT

A rotary electric machine according to present invention comprises a rotor and a stator disposed around the rotor in which the stator includes a stator core having, along its inner periphery region, a plurality of axially extending stator slots and an armature winding wound through the stator slots. In this rotary electric machine, each stator slot contains four radially layered armature bars; each armature winding is formed by electrically connecting at least one of the armature bars in a first slot and at least one of the armature bars in a second slot to each other; and the armature bars of a pair specified in accordance with a required output voltage of the rotary electric machine are connected to each other with a connecting piece.

6 Claims, 11 Drawing Sheets

U.S. PATENT DOCUMENTS

| | | | |
|---|---|---|---|
| 2003/0011268 A1* | 1/2003 | Even et al. | 310/179 |
| 2003/0102761 A1* | 6/2003 | Wada et al. | 310/208 |
| 2003/0222528 A1* | 12/2003 | Dobashi et al. | 310/179 |
| 2004/0061400 A1* | 4/2004 | Fukushima et al. | 310/184 |
| 2004/0164637 A1* | 8/2004 | Seguchi | 310/180 |
| 2005/0017592 A1* | 1/2005 | Fukushima | 310/179 |
| 2005/0082922 A1* | 4/2005 | Armiroli et al. | 310/68 D |
| 2005/0188532 A1* | 9/2005 | Kato et al. | 29/606 |
| 2006/0006757 A1* | 1/2006 | Seguchi | 310/184 |
| 2006/0152100 A1* | 7/2006 | Chen et al. | 310/179 |
| 2006/0214522 A1* | 9/2006 | Kawano | 310/59 |
| 2007/0152520 A1* | 7/2007 | Takahashi et al. | 310/65 |
| 2008/0088196 A1* | 4/2008 | Takahashi et al. | 310/198 |
| 2008/1008815 | 4/2008 | Takahashi et al. | |
| 2008/0238240 A1* | 10/2008 | Takahashi et al. | 310/201 |

FOREIGN PATENT DOCUMENTS

| | | |
|---|---|---|
| JP | 2001-309597 | 11/2001 |

* cited by examiner

ROTARY ELECTRIC MACHINE

CLAIM OF PRIORITY

The present application claims priority from Japanese application serial no. 2008-013229 filed on Jan. 24, 2008, which further claims priority from Japanese patent application serial no. 2007-087357 filed on Mar. 29, 2007, the contents of which are hereby incorporated by reference into this application.

BACKGROUND OF THE INVENTION

1. Field of the Invention

The present invention relates to rotary electric machines, particularly to rotary electric machines having an armature winding of a series winding and/or a parallel winding.

2. Description of Related Art

A typical rotary electric machine has, along the inner periphery region of a stator core, a number of axially extending slots, in which an armature winding is contained. Generally, large-capacity rotary electric machines have two armature bar layers in each slot, and two different armature bar layers respectively in different slots are connected to each other to form a one-turn winding. And, pluralities of one-turn windings are serially connected to achieve a high output voltage.

A different rotary electric machine requires a different optimum design and manufacturing method according to electrical specification. The capacity of a rotary electric machine is predominantly determined by the product of output voltage and current. Here, the output voltage and current are respectively constrained by the dielectric strength of a winding conductor used and temperature rise therein, and there is thus needed a design balance between output voltage and current. An approach to reduce the output voltage of a rotary electric machine to below the dielectric withstand voltage of its winding conductor is to configure the armature winding into a parallel circuit. In the case of two-pole rotary electric machines, there are known other than a series winding, for example, an armature winding having two parallel branches and armature winding having three parallel branches (e.g., "Operation and Maintenance of Large Turbo-Generators", IEEE PRESS, 2004, p. 62; JP-A-2000-50549; and JP-A-2001-309597).

However, changing the output voltage specification of a rotary electric machine, even if the capacity thereof is the same, often involves a design change in the number of the stator slots, stator axial length, etc., resulting in the need for a totally new design and manufacturing method of the rotary electric machine. This increases design and manufacturing lead times, leading to cost increases. Therefore, it is desirable to be able to change the output voltage of a rotary electric machine having fixed external dimensions with minimum design change.

The output voltage of a rotary electric machine such as a generator is inversely proportion to the number of the parallel circuit branches of the armature winding. Specifically, assuming that a relative value for the output voltage of a rotary electric machine having a series armature winding is 1, then relative values for the output voltages of rotary electric machines having two and three parallel armature winding branches are 0.5 and 0.33, respectively. Therefore, a design change of the output voltage of a rotary electric machine can be made by changing the number of the parallel circuit branches of the armature winding. This, however, excessively increases the output current by a factor of 1.5 to 3. Therefore, when the output voltage specification of a rotary electric machine having fixed external dimensions is changed by merely changing the number of the parallel armature winding branches, there is required a design that must allow sufficient margin for dielectric strength and temperature increase in the armature winding, incurring unintended cost increase.

If the output voltage specification of a rotary electric machine having fixed external dimensions can be changed in the range of ratio less than 1.5, this is advantageous for reducing cost of the rotary electric machine. However, in conventional rotary electric machine armature winding configurations, the range of such design change cannot be reduced. Further, conventional rotary electric machine armature winding configurations have a design problem in that merely changing the combination of the series and parallel windings cannot offer sufficient design freedom.

SUMMARY OF THE INVENTION

Under these circumstances, the present invention is originated to solve the above problem. It is an object of the present invention to provide a rotary electric machine having an armature winding configuration, which can offer design freedom for the output voltage and current without the need for a substantial design change such as a structural one.

A rotary electric machine according to the present invention comprises a rotor and a stator disposed around the rotor, in which the stator includes a stator core having a plurality of axially extending slots spaced along the inner periphery region thereof and armature windings accommodated in the slots. This rotary electric machine according to the present invention is characterized in that each slot contains four radially layered armature bars; each armature winding is formed by electrically connecting at least one of the armature bars in a first slot and at least one of the armature bars in a second slot to each other; and the armature bars of a pair specified in accordance with a required output voltage of the rotary electric machine are connected to each other with a connecting piece.

ADVANTAGES OF THE INVENTION

The present invention provides an armature winding configuration for a rotary electric machine that can offer sufficient design freedom for the output voltage; therefore a rotary electric machine having a required output voltage specification can be readily obtained without incurring a significant design change. Specifically, two types of output voltages within an acceptable range can be selected by only changing the connecting structure of the armature winding.

DETAILED DESCRIPTION OF THE PREFERRED EMBODIMENTS

Rotary electric machines according to preferred embodiments of the present invention will be now described in detail with reference to the accompanying drawings. However, the present invention is not limited to the embodiments described herein. Note that the terms "two-turn" winding and "one-turn" winding, as used herein, refer to the number of turns per slot per phase (which will be detailed later).

First Embodiment of the Invention

Figure 1:
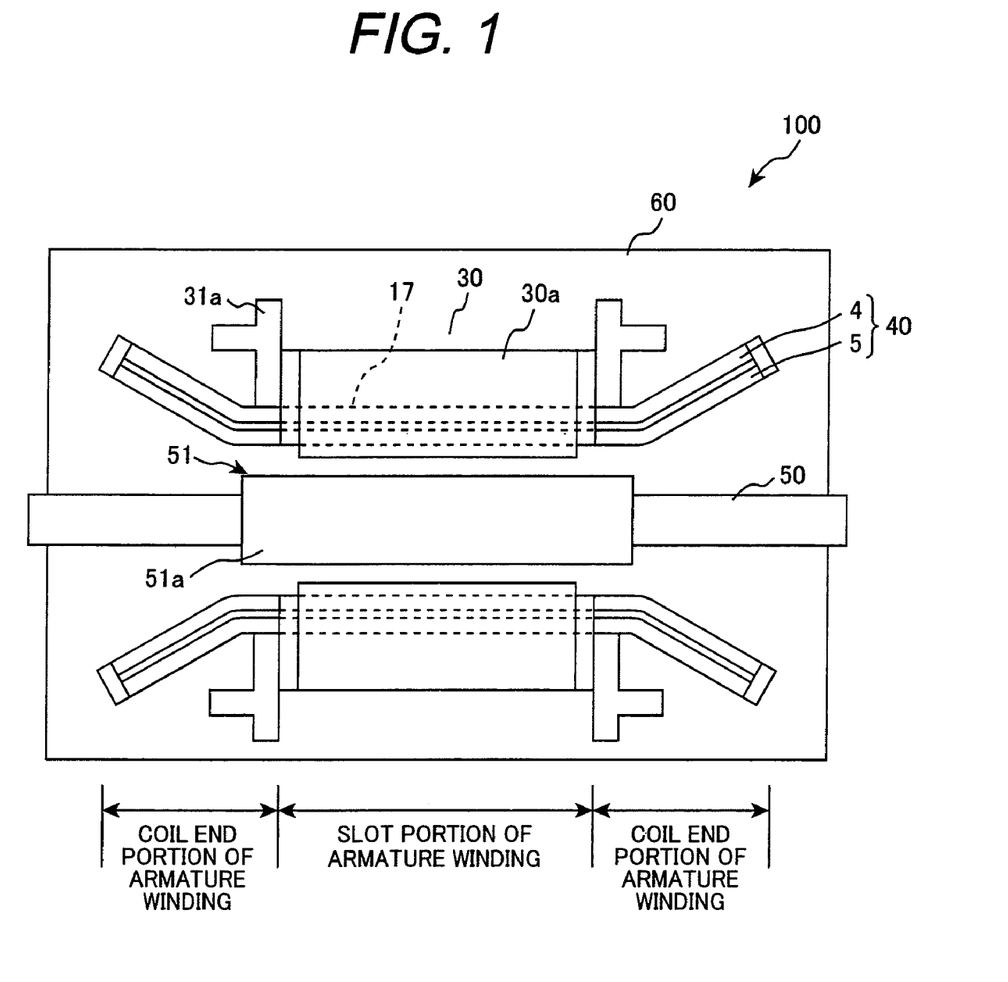
FIG. 1 is a schematic illustration showing a structure of a rotary electric machine according to the present invention.

FIG. 1 is a schematic illustration showing a structure of a rotary electric machine according to the present invention. As an example, the figure shows a rotary electric machine 100, which is a three-phase turbine generator. The rotary electric machine 100 is essentially composed of: a rotor 51 including a rotor core 51a and a field winding (not shown) accommodated in slots (not shown) of the rotor core, and rotating with a rotation shaft 50; a stator 30 including a stator core 30a concentrically surrounding the rotor core 51a and having, along its inner periphery region, a plurality of axially extending slots 17, and an armature winding 40 wound through the slots 17; and a stator casing 60 for supporting or securing the rotor 51 and stator 30 therein.

The plurality of slots 17 are formed to be circumferentially equally spaced along the inner periphery region of the stator core 30a and be extended in parallel to the axis thereof. The armature winding 40 is composed of winding elements each formed by connecting at least one armature bar of a bottom coil 4 in a slot 17 and at least one armature bar of a top coil 5 in another slot 17 to each other via at least one connection piece. Hereinafter, the portions of the armature winding 40 in and out of the slot 17 are referred to as the "slot portion" and "coil end portion", respectively. The rotor 51 is formed of a cylindrical body, around which the field winding (not shown) is wound, thereby forming a plurality of magnetic poles. The stator core 30a concentrically surrounds the outer circumferential surface of the rotor 51 with a certain annular gap, and is supported by end clamps 31a provided at both ends thereof. Each slot 17 contains four armature bars, each extending in the axial direction of the stator core 30a. Although not shown in FIG. 1, one end of the rotation shaft 50 is connected to a steam, a gas turbine, etc.

Figure 2:
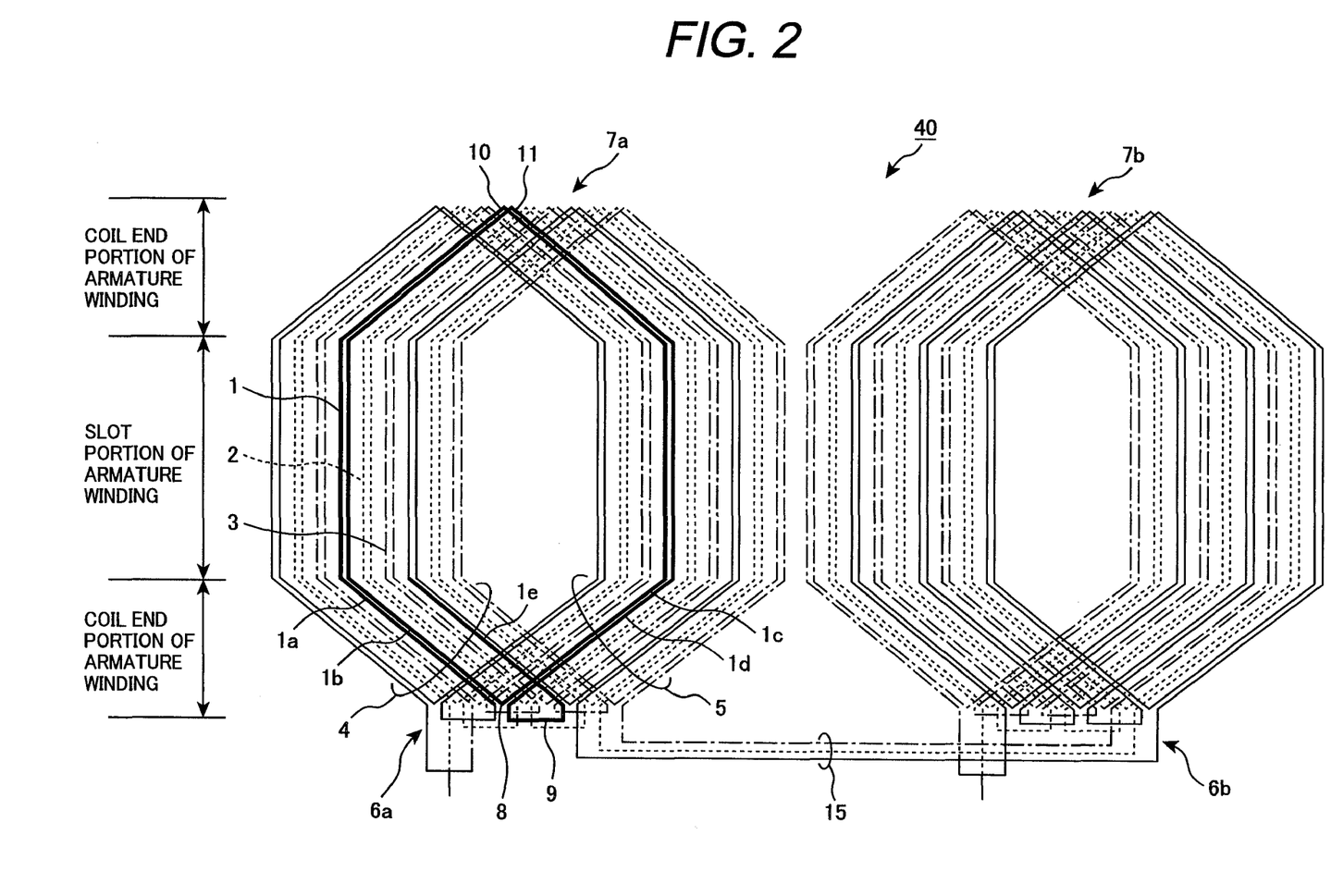
FIG. 2 is a connection diagram of one phase of a three-phase armature winding according to a first embodiment of the present invention.

FIG. 2 is a connection diagram of one phase of the three-phase armature winding 40 according to the first embodiment. Specifically, one phase of the armature winding 40 has three parallel winding branches, each of which includes a plurality of serially connected two-turn windings, each being formed by serially connecting four armature bars (two of the four armature bars in one slot and two of the four armature bars in another slot) to each other. The windings of the other two phases, which are phase shifted from the above phase by an electrical angle of 120 degrees and 240 degrees respectively, have the same connecting configuration as that shown in FIG. 2. As an example, FIG. 2 shows an armature winding of a three-phase two-pole 54-slot rotary electric machine, but the number of slots is not limited to this particular number.

In FIG. 2, the sets of armature windings on the left and right sides of the figure represents the first and second poles of one phase winding, respectively. In the figure, the vertical straight lines of each hexagonal armature winding each represent the "slot portion", while the upward and downward projecting triangular lines thereof each represent the "coil end portion".

In this embodiment, each slot contains four radially stacked armature bar layers, where the pairs of armature bar layers on the radially outward and inward sides respectively serve as the bottom coil 4 and top coil 5. And, each armature winding is composed of the first and second layers of the bottom coil in a slot and the first and second layers of the top coil in another slot. Further, each phase of the armature winding 40 is configured with three parallel circuit branches 1, 2 and 3, respectively represented by the solid, short dashed, and alternate long and short dashed lines in FIG. 2. Each parallel circuit branch has two parallel lines in the figure, indicating that the two armature bar layers of the bottom coil in a slot and the two armature bar layers of the top coil in another slot are serially connected to each other to form a two-turn winding. In the present invention, naturally, the winding of each two-turn winding may be started from the top coil 5 and ended at the bottom coil 4.

The following description will be made for an exemplary case where the parallel circuit branch 1 of the armature winding 40 is wound from the terminal side coil end 6a of the first layer of a bottom coil. Here, a terminal side coil end 6a refers to the coil end on the side having terminals connected to the outside of the armature winding 40, while the coil end on the axially opposite side to the terminal side coil end 6a and having no such terminal is referred to as a non-terminal side coil end 7a. In the figure, armature bars used for explanation are indicated by heavy line. The bottom coil first armature bar layer 1a in a first slot is connected, on the non-terminal side 7a, to the top coil first armature bar layer 1c in a second slot via a connecting piece 10. Then, the top coil first armature bar layer 1c is connected, on the terminal side 6a, to the bottom coil second armature bar layer 1b in the first slot via a connecting piece 8, thereby forming the first turn.

Then, the bottom coil second armature bar layer 1b is connected, on the non-terminal side 7a, to the top coil second armature bar layer 1d via a connecting piece 11 to complete the second turn, thereby providing a two-turn winding configured by serially connecting the two armature bar layers of the bottom coil in a slot and the two armature bar layers of the top coil in a different slot. Here, the armature bar 1a used for the first turn and armature bar 1b used for the second turn are inserted in a slot, while the armature bar 1c used for the first turn and armature bar 1d used for the second turn are inserted in another slot. Then, on the terminal side 6a, the top coil second armature bar layer 1d is serially connected, via a connecting piece 9, to the bottom coil first armature bar layer 1e positioned circumferentially next-but-two to the armature bar layer 1a and used for the next two-turn winding. Similar connecting operations are repeated the required number of times to form a winding for one pole, and then the resulting winding end-edge is connected to the terminal side 6b of the other pole via a connecting line 15. The parallel circuit branches 2 and 3 are also wound in a similar manner to the case of the parallel circuit branch 1, thereby configuring a parallel circuit having three parallel circuit branches.

Figure 3:
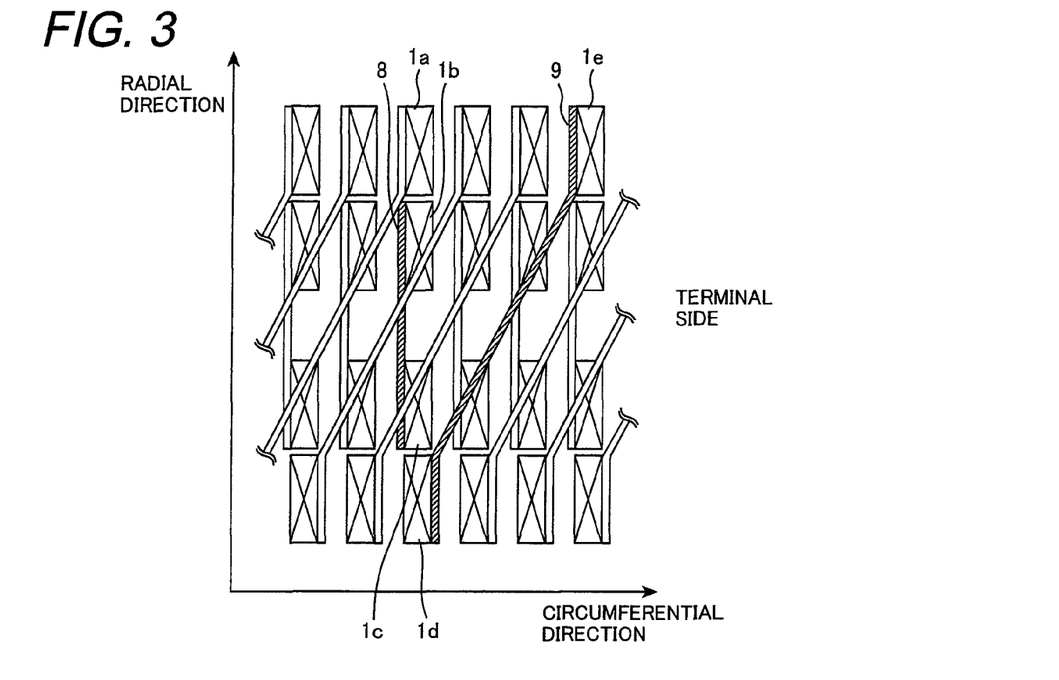
FIG. 3 is a schematic illustration showing a connecting structure on a terminal side of an armature winding in FIG. 2, as viewed in the rotation axis direction, according to a first embodiment of the present invention.

FIG. 3 is a schematic illustration showing a connecting structure on the terminal side 6a of the armature winding 40 in FIG. 2, as viewed in the rotation axis direction, according to the first embodiment, where horizontal and vertical directions in the figure indicate the circumferential and radial directions respectively. The first and second armature bar layers 1a and 1b of the bottom coil are inserted in a slot in this order radially from outward to inward; and the first and second armature bar layers 1c and 1d of the top coil are inserted in another slot in this order radially from outward to inward. Each armature bar is formed of strands (which will be detailed later), and the number of the strands is preferably the same among the armature bar layers, but may not necessarily be the same. In FIG. 3, portions used for explanation are black shaded.

On the terminal side 6a (see FIGS. 2 and 3), the second armature bar layer 1b of the bottom coil and the first armature bar layer 1c of the top coil are connected to each other via the connecting piece 8. The second armature bar layer 1d of the top coil is connected, via the connecting piece 9, to the first armature bar layer 1e of the bottom coil positioned circumferentially next-but-two to the armature bar layer 1a and used for the next two-turn winding.

Figure 4:
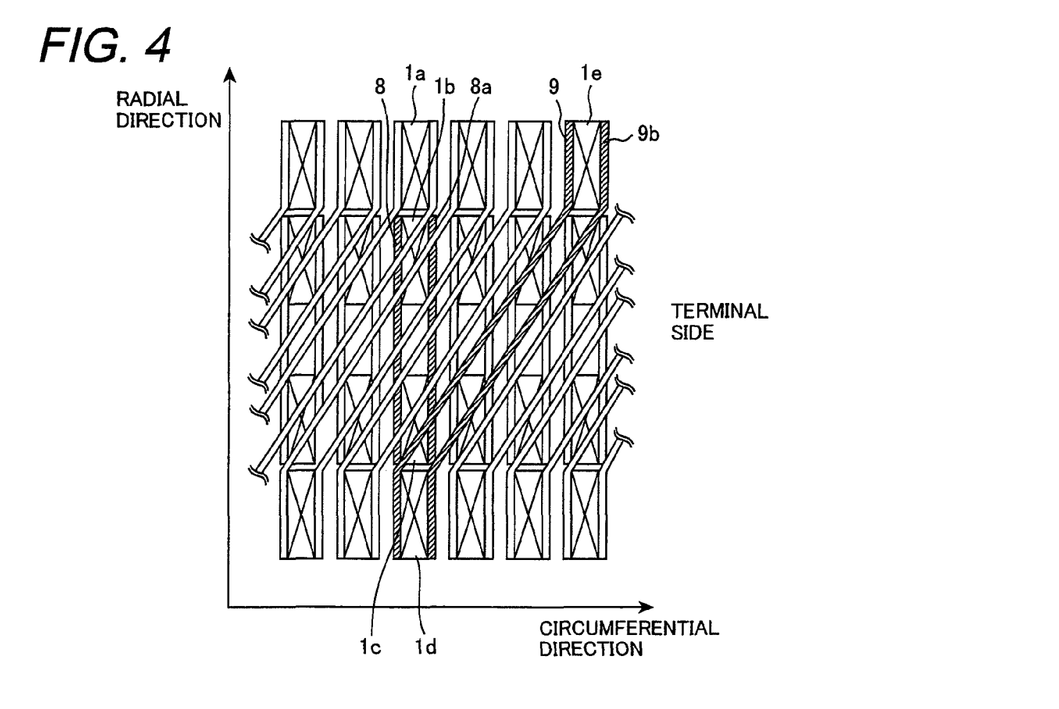
FIG. 4 is a schematic illustration showing a modified connecting structure on a terminal side of an armature winding in FIG. 2, as viewed in the rotation axis direction, according to a first embodiment of the present invention.

In this embodiment, the connecting pieces 8 and 9 are a plate-shape electrically conducting material, but they may be of any shape as long as they are electrically conductive. Further, in FIG. 3 of this embodiment, the connecting pieces 8 and 9 are provided on only one side face of each armature bar, but they may provided on both side faces of each armature bar as shown in FIG. 4. FIG. 4 is a schematic illustration showing a modified connecting structure on the terminal side 6a of the armature winding in FIG. 2, as viewed in the rotation axis direction, according to the first embodiment of the present invention.

Figure 5:
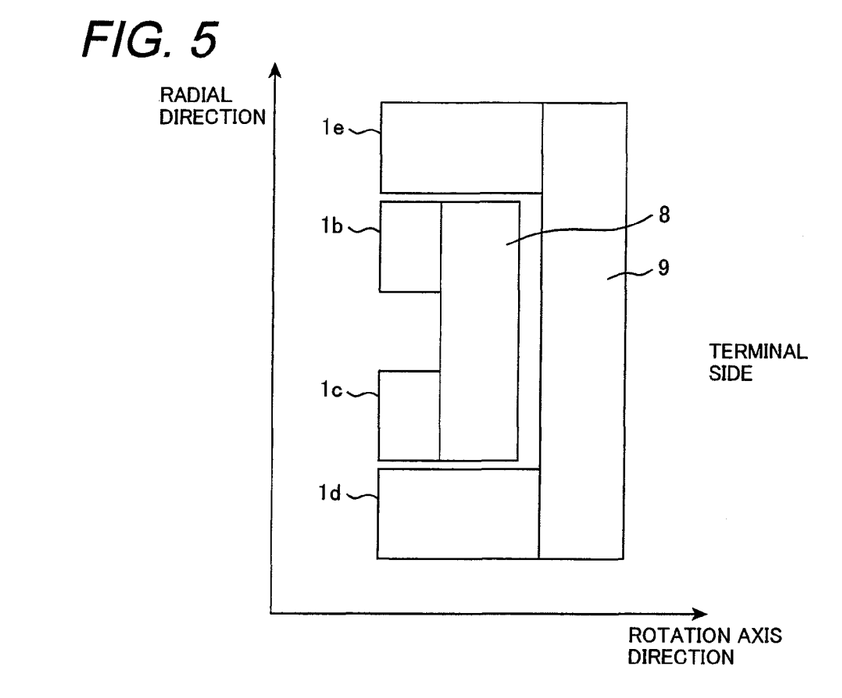
FIG. 5 is a schematic illustration showing a connecting structure on a terminal side of an armature winding in FIG. 2, as viewed in the circumferential direction (side view), according to a first embodiment of the present invention.

FIG. 5 is a schematic illustration showing a connecting structure of the terminal side 6a of the armature winding 40 of FIG. 2, as viewed in the circumferential direction (side view), according to the first embodiment, where horizontal and vertical directions indicate the rotation axis and radial directions respectively. The bottom coil first armature bar layer 1e, the armature bar layer 1a (which is positioned behind the layer 1e and is not shown) and the top coil second armature bar layer 1d have a longer axial length than the bottom coil second armature bar layer 1b and the top coil first armature bar layer 1c. This can prevent the connecting pieces 8 and 9 from interfering with each other.

Figure 6:
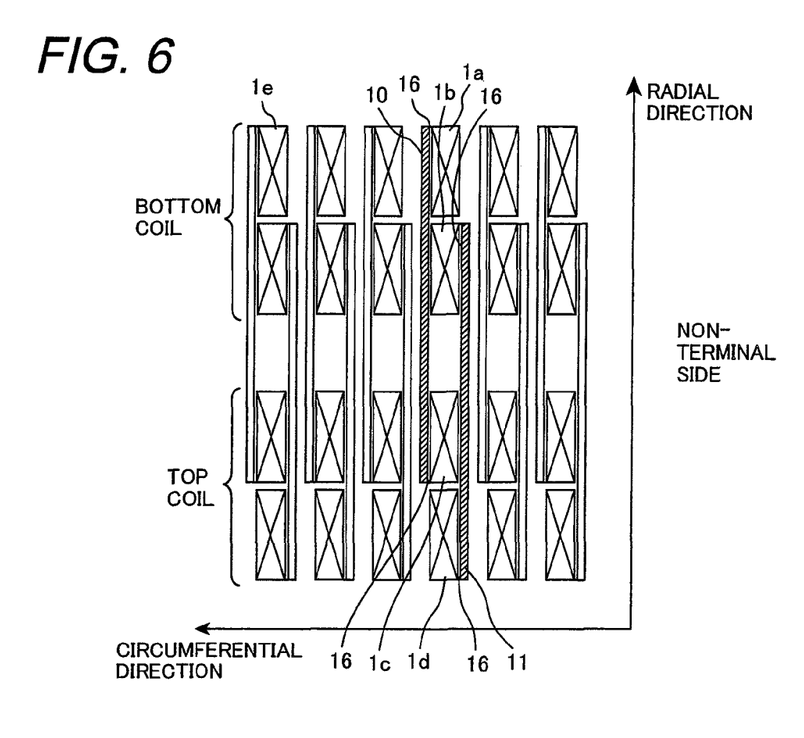
FIG. 6 is a schematic illustration showing a connecting structure on a non-terminal side of an armature winding in FIG. 2, as viewed in the rotation axis direction, according to a first embodiment of the present invention.

FIG. 6 is a schematic illustration showing a connecting structure on the non-terminal side 7a of the armature winding 40 of FIG. 2, as viewed in the rotation axis direction, according to the first embodiment, where the horizontal and vertical directions indicate the circumferential and radial directions respectively. The bottom coil first armature bar layer 1a and top coil first armature bar layer 1c are connected to each other via the connecting piece 10 with connecting spacers 16 sandwiched between the connecting piece 10 and the armature bar layers 1a and 1c respectively.

This can ensure electrical insulation between the connecting piece 10 and the bottom coil second armature bar layer 1b. An insulating spacer (not shown) may be sandwiched between the connecting piece 10 and the bottom coil second armature bar layer 1b in order to provide more secured insulation therebetween. Similarly, the bottom coil second armature bar layer 1b and top coil second armature bar layer 1d are connected to each other via the connecting piece 11 with other connecting spacers 16 sandwiched between the connecting piece 11 and the armature bar layers 1b and 1d respectively. This can ensure electrical insulation between the connecting piece 11 and the top coil first armature bar layer 1c. Also, an insulating spacer (not shown) may be sandwiched between the connecting piece 11 and the top coil first armature bar layer 1c in order to provide more secured insulation therebetween.

Figure 7:
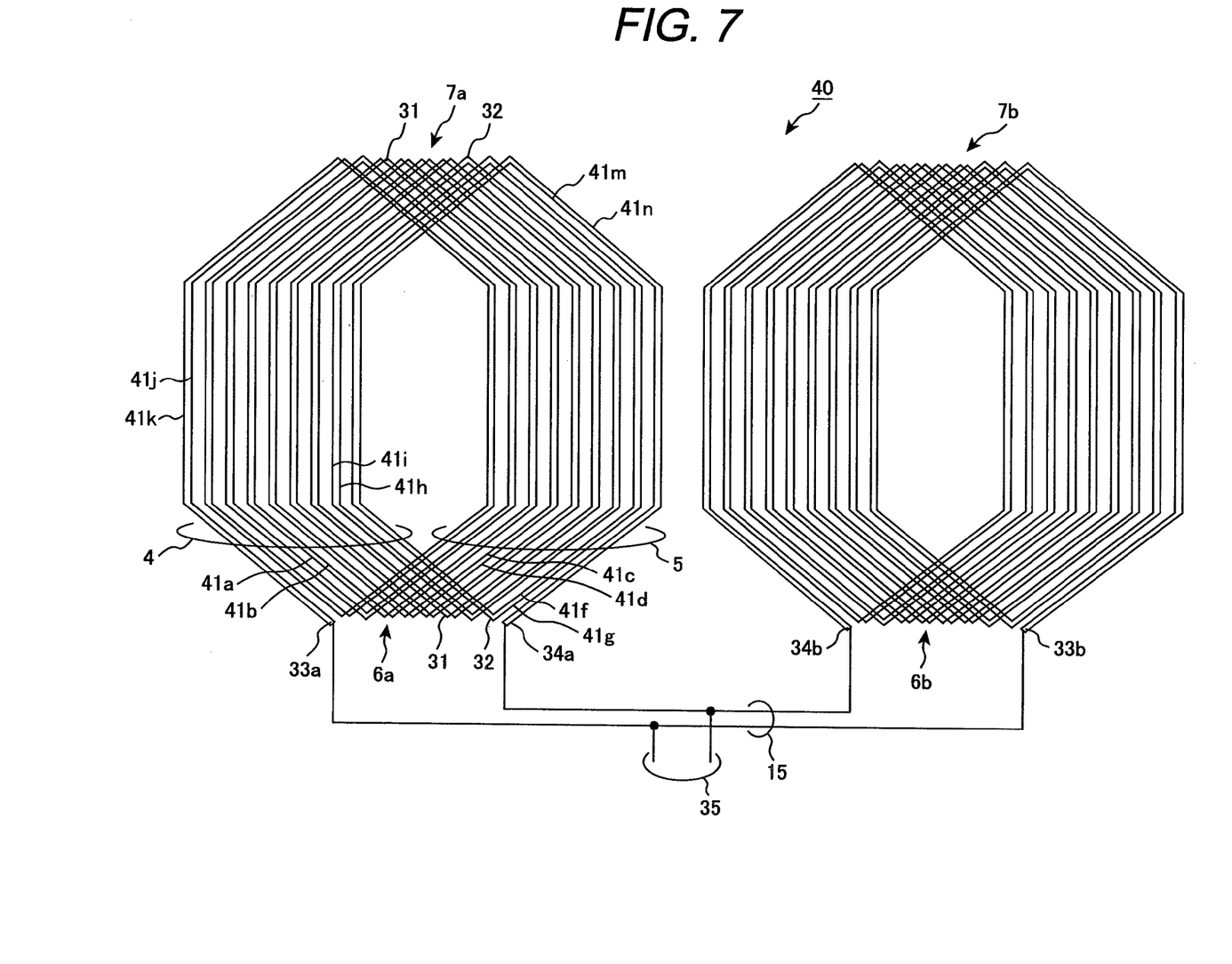
FIG. 7 is another connection diagram of one phase of a three-phase armature winding according to a first embodiment of the present invention.

FIG. 7 is another connecting diagram of one phase of the three-phase armature winding 40 according to the first embodiment. Specifically, in FIG. 7, the two poles of one phase winding are parallel connected. And, each pole has two parallel winding branches each formed by serially connecting a plurality of one-turn windings, each of which is formed by serially connecting one armature bar layer of the bottom coil in a first slot to one armature bar layer of the top coil in a second slot. The windings of the other two phases, which are phase shifted from the above phase by an electrical angle of 120 degrees and 240 degrees respectively, have the same connecting configuration as that shown in FIG. 7. FIG. 7 shows, as an example, an armature winding of a three-phase two-pole 54-slot rotary electric machine, but the number of slots is not limited to this particular number. In FIG. 7, the sets of armature windings on the left and right sides of the figure represent the first and second poles of one phase winding, respectively. Further, the first and second pole windings are parallel circuited by connecting the start-edges 33a and 33b to each other and connecting the end-edges 34a and 34b to each other via respective connecting lines 15, which are connected to respective output terminals 35. There are thereby formed a parallel circuit of two pole windings, each having two parallel winding branches each composed of serially connected one-turn windings.

As shown in FIG. 7, each pole is formed by serially connecting a plurality of one-turn windings. In each pole winding, two armature bar layers (of each of bottom and top coils) respectively used for forming two parallel one-turn winding branches are insulated from each other. Further, two armature bars forming each one-turn winding are connected to each other by two types of connecting structures: forward connection and reverse connection. The forward connection connects the coil ends of the radially inward top coil armature bar layer in a first slot and the radially inward bottom coil armature bar layer in a second slot to each other, and also connects the coil ends of the radially outward top coil armature bar layer in the first slot and the radially outward bottom coil armature bar layer in the second slot to each other, as viewed in the stator core axial direction. By contrast, the reverse connection connects the coil ends of the radially inward top coil armature bar layer in a first slot and the radially outward bottom coil armature bar layer in a second slot to each other, and also connects the coil ends of the radially outward top coil armature bar layer in the first slot and the radially inward bottom coil armature bar layer in the second slot to each other, as viewed in the stator core axial direction. More specifically, the forward connection 31 connects the bottom coil first layer 41*a* in a first slot and the top coil first layer 41*c* in a second slot to each other, and also connects the bottom coil second layer 41*b* in the first slot and the top coil second layer 41*d* in the second slot to each other. And, the reverse connection 32 connects the bottom coil first layer 41*a* in a first slot and the top coil second layer 41*d* in a second slot to each other, and also connects the bottom coil second layer 41*b* in the first slot and the top coil first layer 41*c* in the second slot to each other. In the forward connection 31, the magnetic flux (not shown) linking the two armature bar layers in the bottom coil 4 and that in the top coil 5 are oriented in the same direction. On the contrary, in the reverse connection 32, the magnetic flux (not shown) linking the two armature bar layers in the bottom coil 4 and that in the upper coil 5 are oriented in opposite directions.

In the one-turn armature winding configuration, the magnetic flux linkage (not shown) between the two armature bar layers in the bottom coil 4 and that in the top coil 5 can be made to be different from each other by combining the forward and reverse connections. Therefore, in the one-turn armature winding configuration, the forward connection 31 and reverse connection 32 can be combined in such a manner that the magnetic fluxes respectively linking the two parallel one-turn winding branches wound through each pair of slots cancel each other out. This can reduce unintended induced current such as circulating current.

Figure 8:
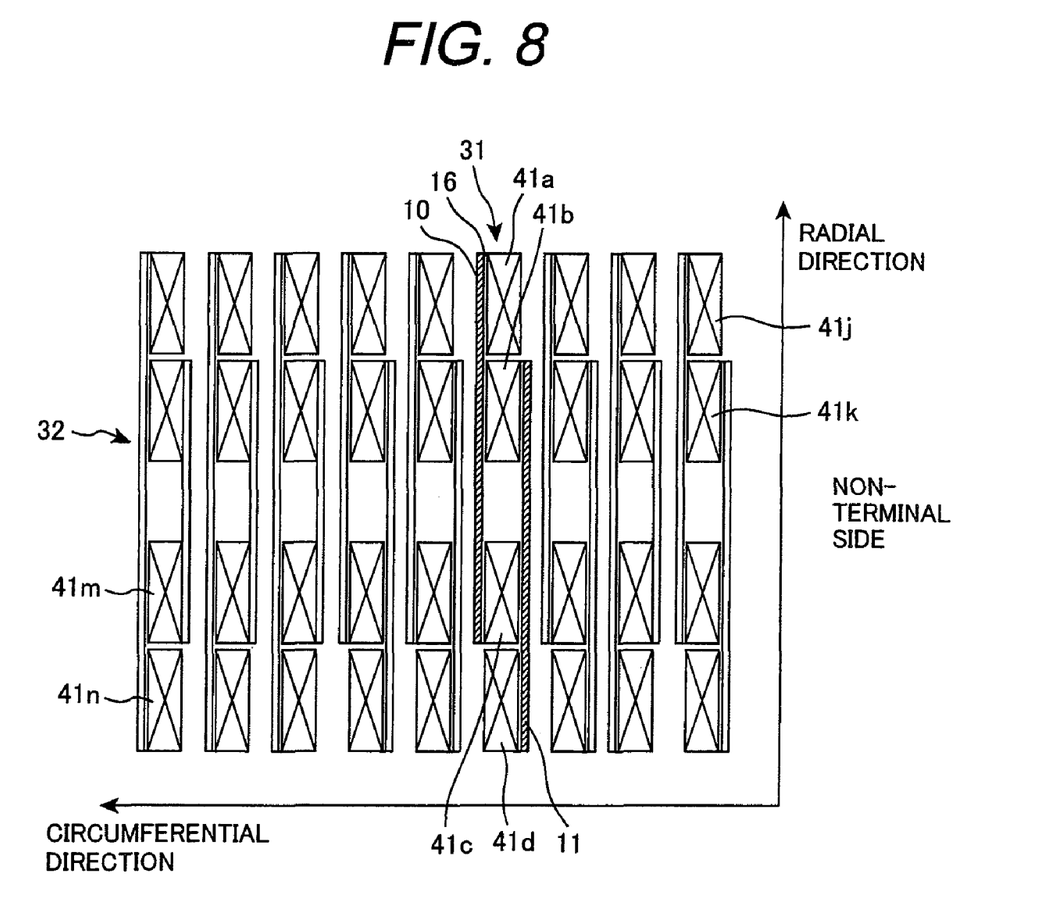
FIG. 8 is a schematic illustration showing a connecting structure on a non-terminal side of an armature winding in FIG. 7, as viewed in the rotation axis direction, according to a first embodiment of the present invention.

FIG. 8 is a schematic illustration showing a connecting structure on the non-terminal side 7*a* of the armature winding 40 in FIG. 7, as viewed in the rotation axis direction, according to the first embodiment, where the horizontal and vertical directions indicate the circumferential and radial directions respectively. The forward connection 31 is described in the following. The bottom coil first armature bar layer 41*a* and top coil first armature bar layer 41*c* are connected to each other via a connecting piece 10 with connecting spacers 16 sandwiched between the connecting piece 10 and the armature bar layers 41*a* and 41*c* respectively. Here, each armature bar, each connecting spacer 16 and the connecting piece 10 are electrically connected to each other by brazing or the like.

Provision of the connecting spacers 16 can ensure electrical insulation between the connecting piece 10 and the bottom coil second armature bar layer 41*b*. An insulating spacer (not shown) may be sandwiched between the connecting piece 10 and the bottom coil second armature bar layer 41*b* in order to provide more secured insulation therebetween. Similarly, the bottom coil second armature bar layer 41*b* and top coil second armature bar layer 41*d* are connected to each other via a connecting piece 11 with other connecting spacers 16 sandwiched between the connecting piece 11 and the armature bar layers 41*b* and 41*d* respectively. This can ensure electrical insulation between the connecting piece 11 and the top coil first armature bar layer 41*c*. An insulating spacer (not shown) may be sandwiched between the connecting piece 11 and the top coil first armature bar layer 41*c* in order to provide more secured insulation therebetween.

Figure 9:
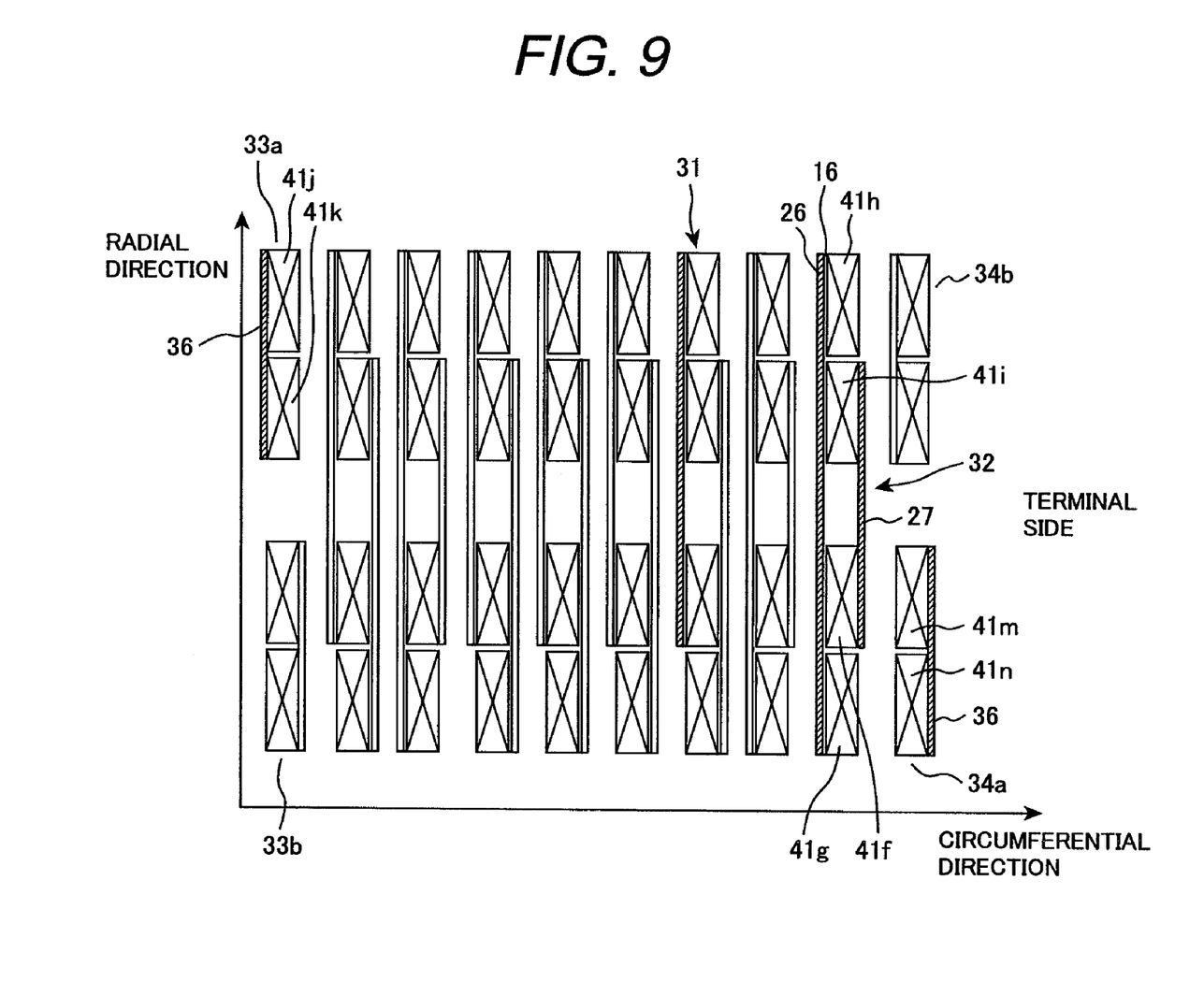
FIG. 9 is a schematic illustration showing a connecting structure on a terminal side of an armature winding in FIG. 7, as viewed in the rotation axial direction, according to a first embodiment of the present invention.

FIG. 9 is a schematic illustration showing a connecting structure on the terminal side 6*a* of the armature winding 40 in FIG. 7, as viewed in the rotation axis direction, according to the first embodiment, where the horizontal and vertical directions indicate the circumferential and radial directions respectively. The reverse connection 32 is described in the following. The bottom coil first armature bar layer 41*h* and top coil second armature bar layer 41*g* are electrically connected to each other via a connecting piece 26 with connecting spacers 16 sandwiched between the connecting piece 26 and the armature bar layers 41*h* and 41*g* respectively. Here, each armature bar, each connecting spacer 16 and the connecting piece 26 are electrically connected to each other by brazing or the like.

Provision of the connecting spacers 16 can ensure electrical insulation between the connecting piece 26 and the bottom coil second armature bar layer 41*i* and between the connecting piece 26 and the top coil first armature bar layer 41*f*. In order to provide more secured insulation, an insulating spacer (not shown) may be sandwiched between the connecting piece 26 and the bottom coil second armature bar layer 41*i* and between the connecting piece 26 and the top coil first armature bar layer 41*f*. The bottom coil second armature bar layer 41*i* and top coil first armature bar layer 41*f* are electrically connected to each other via a connecting piece 27. Here, each armature bar and the connecting piece 27 are electrically connected to each other by brazing or the like.

Next, the start-edge 33*a* and end-edge 34*a* of the winding will be described with reference to FIG. 9. The two parallel circuit branches are formed of a plurality of pairs of armature bar layers inserted in a plurality of slots. At the start-edges 33*a* of the two parallel circuit branches of one-turn windings, bottom coil first and second armature bar layers 41*j* and 41*k* are electrically connected to each other via a connecting piece 36. Similarly, at the end-edges 34*a*, top coil first and second armature bar layers 41*m* and 41*n* are electrically connected to each other via another connecting piece 36. Furthermore, the start-edges 33*b* of the other pole are connected to each other and also the end-edges 34*b* thereof are connected to each other.

Figure 10:
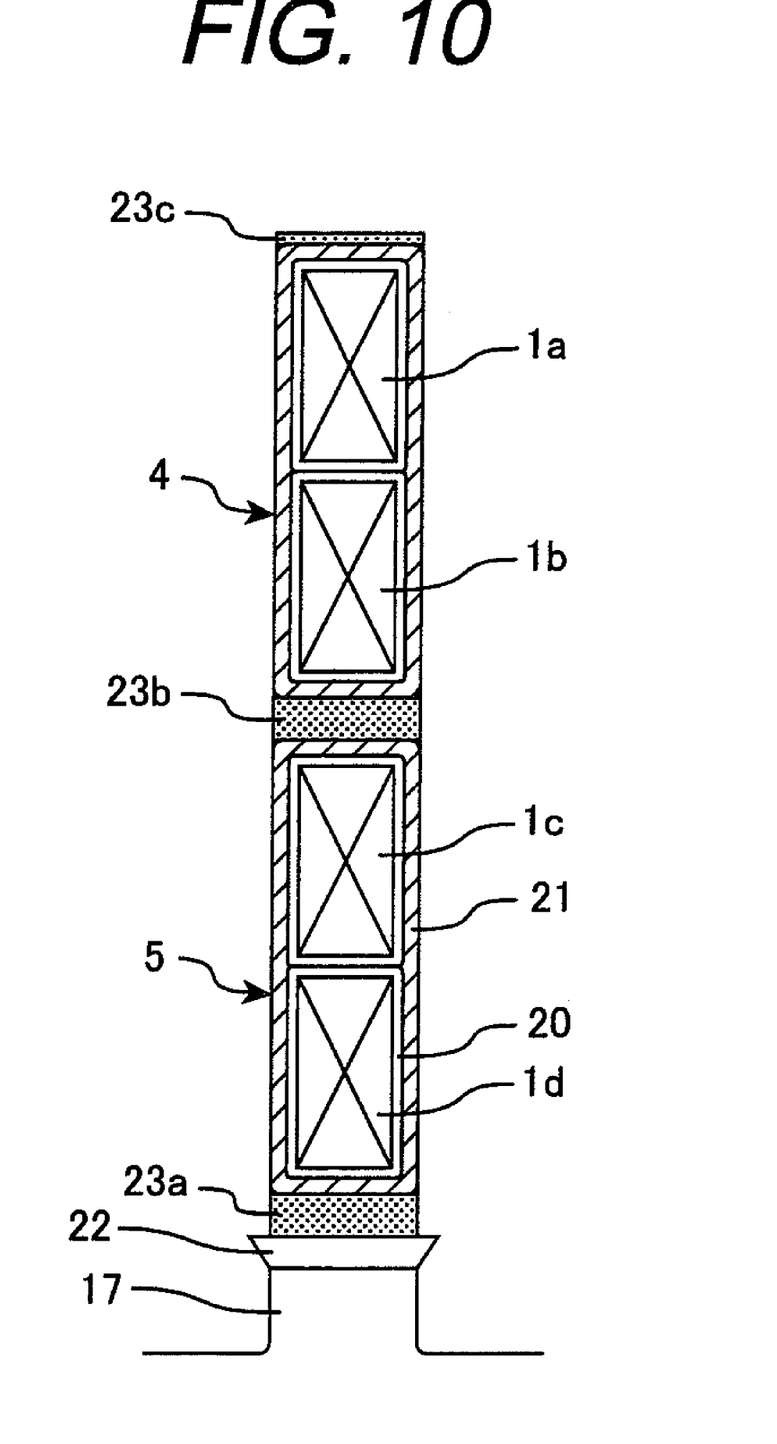
FIG. 10 is a schematic illustration showing a cross sectional view of a structure of a slot containing armature bar layers according to the present invention.

FIG. 10 is a schematic illustration showing a cross sectional view of a structure of a slot 17 containing armature bar layers according to the present invention. The bottom coil 4 includes two armature bar layers 1*a* and 1*b*, while the top coil 5 includes two armature bar layers 1*c* and 1*d*. Around each of the two armature bar layers of each coil is applied an insulation 20 to ensure electrical insulation. Here, the electrical potential difference between the two armature bar layers in each coil is smaller than that between each armature bar layer and ground; therefore, the insulation 20 does not need as much dielectric strength as a ground-wall insulation 21. Around each of the bottom and top coils is applied the ground-wall insulation 21 to ground. And, the two coils are contained in the slot 17 together with spacers 23*a*, 23*b* and 23*c*, all of which are then fastened together by a wedge 22 (see FIG. 10). In FIG. 10, the insulation 20 is applied around the two armature bar layers in each coil, around all of which is then applied the ground-wall insulation 21, but instead a ground-wall insulation 21 may be individually applied around each armature bar layer.

In the present invention, each slot contains four armature bar layers; therefore, the radial thickness of one armature bar layer can be reduced compared to conventional two-armature-bar-layer configurations. This reduces magnetic flux linking one armature bar layer, and therefore AC loss generation can be reduced, leading to a high efficiency rotary electric machine.

Figure 11:
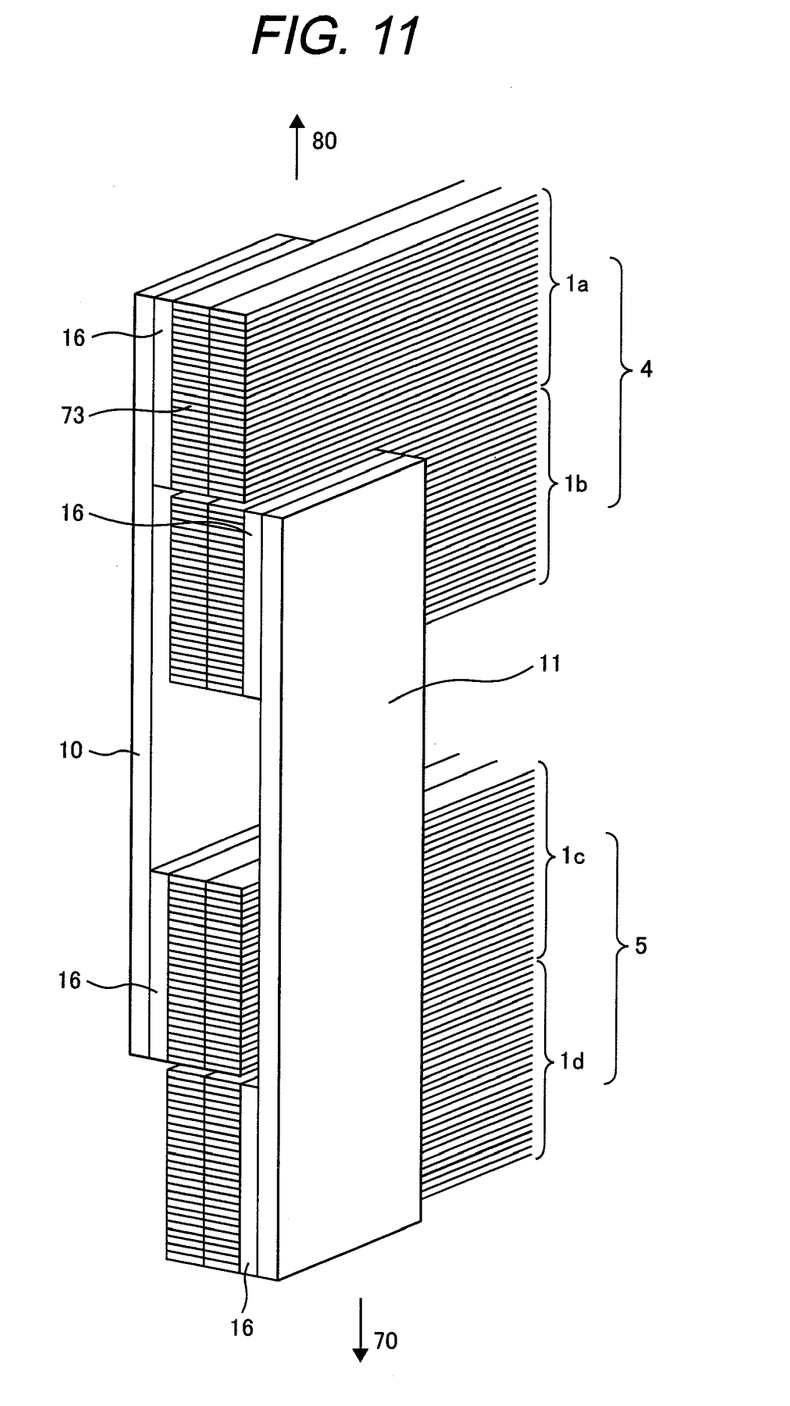
FIG. 11 is a schematic illustration showing a perspective view of a connecting structure of armature bars and connecting pieces shown in FIG. 6 according to a first embodiment of the present invention.

A specific manner of electrically connecting the armature bar, connecting spacer and connecting piece to each other will now be described. FIG. 11 is a schematic illustration showing a perspective view of a connecting structure of the armature bars and connecting pieces shown in FIG. 6 according to the first embodiment of the present invention.

As shown in FIG. 11, the armature bar layers are divided into a bottom coil 4 on the radially outward side 80 and a top coil 5 on the radially inward side 70, and each armature bar is composed of a plurality of (e.g., two) laterally adjacent stacks of strands 73. The bottom coil 4 includes two layers, the bottom coil first and second layers 1a and 1b stacked in the vertical direction of the figure. Likewise, the top coil 5 includes two layers, the top coil first and second layers 1c and 1d stacked in the vertical direction of the figure. The numbers of the strands 73 in the bottom coil first and second layers 1a and 1b are preferably the same, but they may be different. By the same token, the numbers of the strands 73 in the top coil first and second layers 1c and 1d are preferably the same, but they may be different.

The bottom coil first and second layers 1a and 1b are electrically insulated from each other by a spacer or insulating layer (not shown in the figure). Similarly, the top coil first and second layers 1c and 1d are electrically insulated from each other by a spacer or insulating layer (not shown in the figure). Each of the bottom coil first and second layers 1a and 1b, and top coil first and second layers 1c and 1d is formed by transposing the strands 73 therein. Each strands 73 is preferably transposed through 360 degrees or more in each slot, more preferably 540 degrees. Thereby, losses can be reduced.

The bottom coil second armature bar layer 1b and top coil second armature bar layer 1d are electrically connected to each other via a connecting piece 11 with connecting spacers 16 sandwiched between the connecting piece 11 and the armature bar layers 1b and 1d respectively. And, each armature bar, each connecting spacer 16 and the connecting piece 11 are electrically connected to each other by brazing or the like. Here, the connecting spacers 16 are for preventing the top coil first and second armature bar layers 1c and 1d from being short-circuited through the connecting piece 11. An insulating spacer (not shown in the figure) may be sandwiched between the connecting piece 11 and the top coil first armature bar layer 1c in order to provide more secured insulation therebetween, as mentioned before.

Similarly, the bottom coil first armature bar layer 1a and top coil first armature bar layer 1c are electrically connected, via a connecting piece 10, to each other by brazing. Here, a connecting spacer 16 is sandwiched between the connecting piece 10 and each of the two armature bar layers in order to prevent short circuiting between the bottom coil first and second armature bar layers 1a and 1b through the connecting piece 10. An insulating spacer (not shown) may be sandwiched between the connecting piece 10 and the bottom coil second armature bar layer 1b in order to provide more secured insulation therebetween.

In the above-described first type connection of this embodiment (see FIG. 2), each two-turn winding is formed by serially connecting four armature bars (two of the four armature bars in one slot and two of the four armature bars in another slot) to each other; therefore, the total number of turns of the armature winding for one phase is twice that of conventional winding methods. Further, each phase is configured with three parallel circuit branches, resulting in an overall configuration having 3/2 parallel circuit branches; therefore, the voltage generated is 0.67 times that of a series circuit.

On the other hand, in the second type connection (see FIG. 7), each pole of one phase includes two parallel winding branches, each of which is formed by serially connecting one-turn windings each formed by connecting two armature bars (one of the four armature bars in one slot and one of the four armature bars in another slot) to each other, and the two poles of one phase are parallel circuited; therefore the voltage generated is 0.5 times that of a series circuit. In the present invention, the ratio of voltage generated by the first type parallel circuit to that generated by the second type parallel circuit is 1.33; therefore, a single armature core configured with armature bars having a specific dielectric strength and thermal resistance can be used to provide two types of rotary electric machines respectively having different output voltages. Further, this specification change can be done by changing only the connecting configuration using the connecting pieces, and thus design and manufacturing lead times can be reduced, leading to cost reduction.

Further, each slot contains four armature bar layers and therefore the armature bar size per layer can be reduced compared to that in conventional two-layer configurations. This reduces magnetic flux linking each armature bar, and therefore reduces AC losses of an armature winding, thus having an advantage of providing a highly efficient rotary electric machine.

Second Embodiment of the Invention

Figure 12:
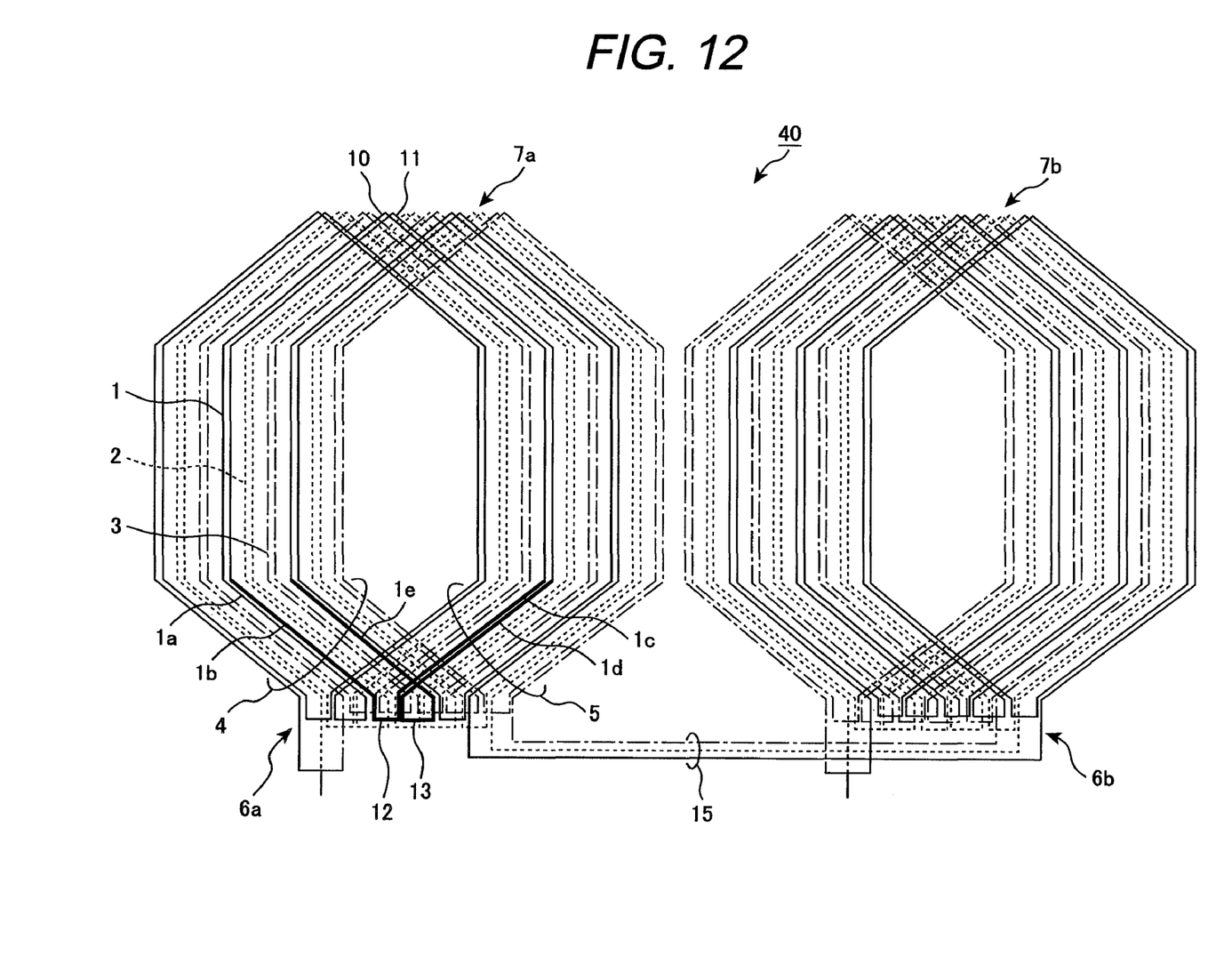
FIG. 12 is a connection diagram of one phase of a three-phase armature winding according to a second embodiment of the present invention.

FIG. 12 is a connection diagram of one phase of a three-phase armature winding according to a second embodiment of the present invention. The structure of the rotary electric machine is similar to that according to the first embodiment (FIG. 1) and therefore the description thereof is omitted.

The connection in FIG. 12 differs from that in FIG. 2 of the first embodiment in the structure for connecting armature bar coil ends to each other on the terminal side 6a. In the FIG. 2 first embodiment, the connecting piece for forming each two-turn winding connects an armature bar coil end to another armature bar coil end both of which are positioned circumferentially the same, while the connecting piece for connecting neighboring ones of a plurality of the two-turn windings to each other connects an armature bar coil end to another armature bar coil end positioned circumferentially the next-but-two armature bar.

Figure 13:
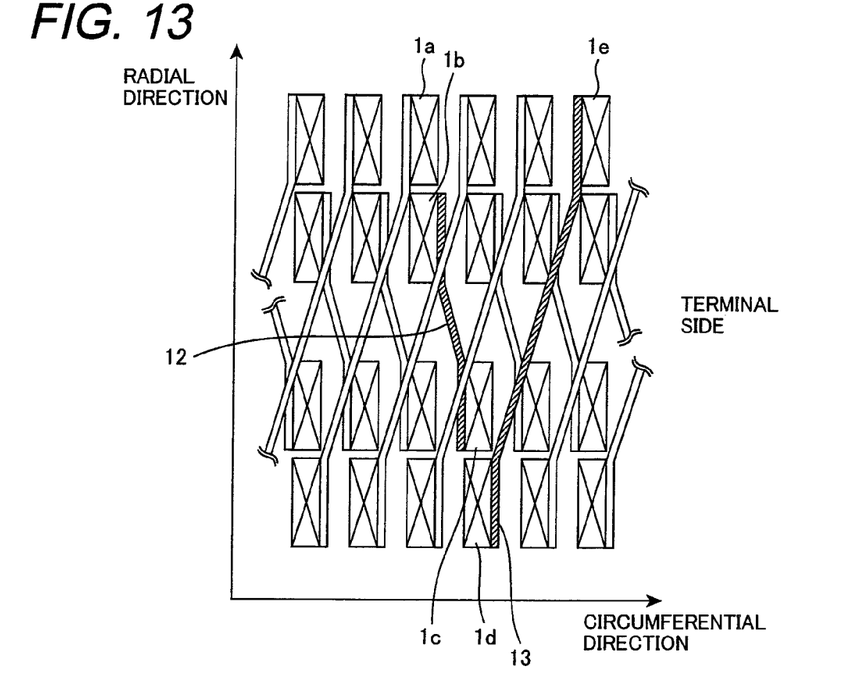
FIG. 13 is a schematic illustration showing a connecting structure on a terminal side of an armature winding in FIG. 12, as viewed in the rotation axis direction, according to a second embodiment of the present invention.

In contrast, in the second embodiment shown in FIG. 12, the connecting piece for forming each two-turn winding connects an armature bar coil end to another armature bar coil end positioned circumferentially the next armature bar, while the connecting piece for connecting neighboring ones of a plurality of the two-turn windings to each other connects an armature bar coil end to another armature bar coil end positioned circumferentially the next-but-one armature bar. The connection configuration will be explained more specifically. FIG. 13 is a schematic illustration showing a connecting structure on the terminal side 6a of the armature winding 40 in FIG. 12, as viewed in the rotation axis direction, according to the second embodiment, where the horizontal and vertical directions indicate the circumferential and radial directions respectively. As shown in FIG. 13, on the terminal side 6a, the coil end of the bottom coil second armature bar layer 1b positioned outside a first slot is connected, via a connecting piece 12 extending across one slot pitch, to the coil end of the top coil first armature bar layer 1c positioned outside a second slot which is next to the first slot. And, on the terminal side 6a, the coil end of the top coil second armature bar layer 1d positioned outside the second slot is connected, by a connecting piece 13 extending across two slot pitches, to the coil end of the top coil first armature bar layer 1e (used for the next two-turn winding) positioned outside a third slot which is next-but-one to the second slot (which is next-but-two to the first slot). Each armature bar and each of the connecting pieces 12 and 13 are electrically connected to each other by brazing or the like.

The detailed connecting structure has already been described in FIG. 11, and therefore a repeated description is dispensed with below. This embodiment has an advantage of facilitating connection of the connecting pieces for large-capacity rotary electric machines. In this embodiment, the connecting structure of the armature winding on the non-terminal side 7*a* is the same as that shown in FIG. 6. This embodiment also has advantages similar to those of the first embodiment.

Third Embodiment of the Invention

Figure 14:
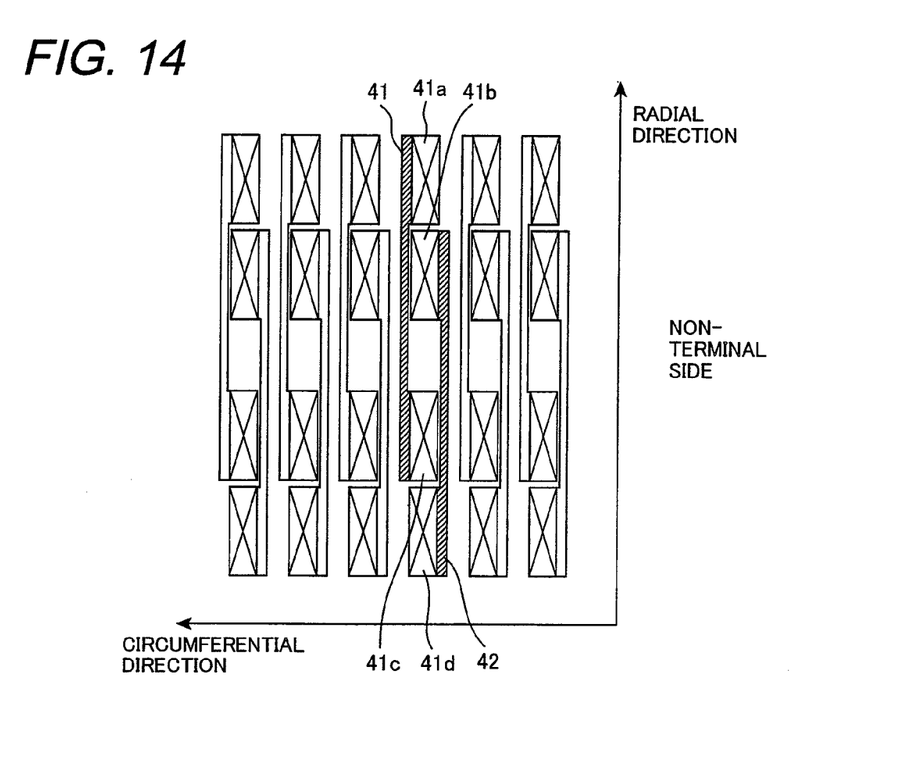
FIG. 14 is a schematic illustration showing a connecting structure on a non-terminal side of an armature winding according to a third embodiment of the present invention, as viewed in the rotation axis direction.

FIG. 14 is a schematic illustration showing a connecting structure on the non-terminal side 7*a* of an armature winding 40 according to a third embodiment, as viewed in the rotation axis direction, where the horizontal and vertical directions indicate the circumferential and radial directions respectively. The FIG. 14 example of the third embodiment differs from the FIG. 6 example of the first embodiment in the form of their connecting pieces. In the FIG. 6 first embodiment, each armature bar and each of the connecting pieces 10 and 11 are connected to each other with the connecting spacer 16 sandwiched therebetween.

By contrast, the connecting pieces 41 and 42 in the FIG. 14 third embodiment are an electrically conductive step-wise structured member having at least two thicknesses, in which the portion connected to each armature bar has a thickness greater than the other portions. That is, a bottom coil first armature bar layer 41*a* and a top coil first armature bar layer 41*c* are connected to each other via a step-wise structured connecting piece 41, whose portion that is connected to each of the two armature bar layers 41*a* and 41*c* has a thickness greater than the other portions. Use of the step-wise structured connecting piece 41 can ensure insulation between itself and a bottom coil second armature bar layer 41*b*, thereby eliminating the need of the connecting spacers 16 in FIG. 6. Similarly, the bottom coil second armature bar layer 41*b* and a top coil second armature bar layer 41*d* can be connected to each other by a step-wise structured connecting piece 42 while ensuring insulation between the connecting piece 42 and top coil first armature bar layer 41*c*.

In order to provide more secured insulation, an insulating spacer (not shown) may be sandwiched between the step-wise structured connecting piece 41 and the bottom coil second armature bar layer 41*b* and between the step-wise structured connecting piece 42 and the top coil first armature bar layer 41*c*. Similarly to the first embodiment, each armature bar and the step-wise structured connecting piece are electrically connected to each other by brazing the like. Furthermore, in the first embodiment examples shown in, e.g., FIGS. 8 and 9, use of such a step-wise structured connecting piece can eliminate the need of the connecting spacers 16. The third embodiment also has advantages similar to those of the first and second embodiments.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A rotary electric machine having at least one AC phase, the rotary electric machine comprising:
 a rotor; and
 a stator disposed around the rotor, including a stator core having a plurality of axially extending slots spaced along an inner periphery region of the stator core and armature windings accommodated in the slots;
 wherein:
 each slot contains four armature bars each extending in an axial direction of the stator core;
 each armature winding is formed by electrically connecting at least one of the armature bars in a first slot and at least one of the armature bars in a second slot to each other;
 the armature bars of a pair specified in accordance with a required output voltage of the rotary electric machine are connected to each other, via a connecting piece;
 each armature winding is a one-turn winding formed by serially connecting one of the armature bars in the first slot and one of the armature bars in the second slot, via the connecting piece;
 two of the one-turn windings are formed in parallel using two of the armature bars in the first slot and two of the armature bars in the second slot;
 each AC phase has two parallel circuit branches each composed of the one-turn windings;
 each armature bar has a coil end on its both ends; and
 connections of two of the armature bars on each coil end have two types of connection configurations: a forward connection and a reverse connection.

2. The rotary electric machine according to claim 1, wherein:
 each AC phase has at least one pole;
 each pole of each AC phase is formed by serially connecting a plurality of the one-turn windings; and
 two of the armature bars in each slot used for forming the respective one-turn windings in each pole are insulated from each other.

3. The rotary electric machine according to claim 1, wherein the connection of two of the armature bars is performed with an additional spacer sandwiched between each of the two armature bars and the connecting piece.

4. The rotary electric machine according to claim 1, wherein the connection piece is of a step-wise form having at least two thicknesses, the portion connected to each armature bar having a thickness greater than the other portions thereof.

5. The rotary electric machine according to claim 1, wherein:
 pairs of the four armature bar layers on radially outward and inward sides in each slot respectively serve as a bottom coil and a top coil;
 the forward connection connects a first layer of the bottom coil in a first slot and a first layer of the top coil in a second slot to each other, and also connects a second layer of the bottom coil in the first slot and a second layer of the top coil in the second slot to each other; and
 the reverse connection connects a first layer of the bottom coil in a first slot and a second layer of the top coil in a second slot to each other, and also connects a second layer of the bottom coil in the first slot and a first layer of the top coil in the second slot to each other.

6. The rotary electric machine according to claim 1, wherein:
 the four armature bars are four radially layered armature bars;
 the forward connection connects, in one slot, a first layer of the four radially layered armature bars and a third layer of the four radially layered armature bars to each other, and also connects a second layer of the four radially layered armature bars and a fourth layer of the four radially layered armature bars to each other; and the reverse connection connects, in one slot, a first layer of the four radially layered armature bars and a fourth layer of the four radially layered armature bars to each other and also connects a second layer of the four radially layered armature bars and a third layer of the four radially layered armature bars to each other.

* * * * *